United States Patent
Da Costa et al.

(10) Patent No.: US 10,916,991 B2
(45) Date of Patent: Feb. 9, 2021

(54) DC-DC CONVERTER IN A NON-STEADY SYSTEM

(71) Applicant: Mainspring Energy, Inc., Menlo Park, CA (US)

(72) Inventors: Anthony Da Costa, Mountain View, CA (US); John Powers, Menlo Park, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 0 days.

(21) Appl. No.: 16/745,155

(22) Filed: Jan. 16, 2020

(65) Prior Publication Data
US 2020/0227976 A1 Jul. 16, 2020

Related U.S. Application Data

(63) Continuation of application No. 16/137,029, filed on Sep. 20, 2018, now Pat. No. 10,554,099.

(Continued)

(51) Int. Cl.
| | |
|---|---|
| *F02B 71/06* | (2006.01) |
| *H02K 7/18* | (2006.01) |
| *F02B 71/04* | (2006.01) |
| *H02M 3/06* | (2006.01) |
| *F02B 63/04* | (2006.01) |
| *H02M 3/158* | (2006.01) |

(Continued)

(52) U.S. Cl.
CPC ......... *H02K 7/1884* (2013.01); *F02B 63/041* (2013.01); *F02B 71/04* (2013.01); *H02M 3/06* (2013.01); *H02M 3/1582* (2013.01); *H02P 6/006* (2013.01); *H02P 9/04* (2013.01); *H02P 25/032* (2016.02); *F02B 71/06* (2013.01)

(58) Field of Classification Search
CPC ......... F02B 63/041; F02B 71/04; F02B 71/06
See application file for complete search history.

(56) References Cited

U.S. PATENT DOCUMENTS

| | | | |
|---|---|---|---|
| 3,673,999 A | 7/1972 | Lacy et al. | |
| 5,172,784 A | 12/1992 | Varela | |

(Continued)

FOREIGN PATENT DOCUMENTS

| | | |
|---|---|---|
| DE | 112012000915 T5 | 11/2013 |
| EP | 0981196 A2 | 2/2000 |
| WO | WO2005003543 A1 | 1/2005 |

OTHER PUBLICATIONS

International Search Report and Written Opinion dated Mar. 7, 2019 for Application No. PCT/US2018/051989.

*Primary Examiner* — Thomas N Moulis
(74) *Attorney, Agent, or Firm* — Haley Guiliano LLP; Alexander Shvarts; Andrew C. Lee

(57) ABSTRACT

Multiphase electromagnetic machines, such as free-piston engines or compressors, may require, or supply, a pulsed power profile from or to a DC bus, respectively. The pulsed power profile may include relatively large fluctuations in instantaneous power. Sourcing, sinking, or otherwise exchanging power with an AC grid, via an inverter, may be accomplished by using an energy storage device and a DC-DC converter coupled to a DC bus. The energy storage device may aid in smoothing the pulsed power profile, while the DC-DC converter may aid in reducing fluctuations in voltage across a DC bus due to energy storage in the energy storage device.

20 Claims, 6 Drawing Sheets

Related U.S. Application Data

(60) Provisional application No. 62/561,167, filed on Sep. 20, 2017.

(51) Int. Cl.
  *H02P 6/00* (2016.01)
  *H02P 25/032* (2016.01)
  *H02P 9/04* (2006.01)

(56) References Cited

U.S. PATENT DOCUMENTS

| | | |
|---|---|---|
| 5,174,117 A | 12/1992 | Naito et al. |
| 5,428,267 A | 6/1995 | Peil |
| 5,459,360 A | 10/1995 | Varo et al. |
| 6,050,092 A | 4/2000 | Genstler et al. |
| 6,541,875 B1 | 4/2003 | Berlinger et al. |
| 7,923,965 B2 | 4/2011 | Rittler et al. |
| 8,376,070 B2 | 2/2013 | Waszak |
| 9,657,675 B1 | 5/2017 | Roelle et al. |
| 9,719,415 B2 | 8/2017 | Gadda et al. |
| 10,132,238 B2 | 11/2018 | Sun et al. |
| 10,202,897 B2 | 2/2019 | Sun et al. |
| 2003/0024492 A1 | 2/2003 | Malmquist et al. |
| 2005/0023835 A1 | 2/2005 | Toyoda et al. |
| 2005/0028520 A1 | 2/2005 | Chertok |
| 2006/0124083 A1 | 6/2006 | Niiyama et al. |
| 2008/0012538 A1 | 1/2008 | Stewart et al. |
| 2009/0101421 A1 | 4/2009 | Oyobe et al. |
| 2009/0206667 A1 | 8/2009 | Holliday |
| 2010/0182809 A1 | 7/2010 | Cullinane et al. |
| 2010/0320949 A1 | 12/2010 | Fotherby |
| 2013/0187446 A1 | 7/2013 | Ferrel et al. |
| 2014/0028266 A1 | 1/2014 | Demetriades |
| 2016/0146153 A1 | 5/2016 | Hesselink et al. |
| 2016/0160754 A1 | 6/2016 | Moriya et al. |
| 2016/0211785 A1 | 7/2016 | Green et al. |
| 2016/0369761 A1 | 12/2016 | Schnellinger et al. |
| 2017/0198401 A1 | 7/2017 | Phillips |
| 2018/0006561 A1 | 1/2018 | Toyama et al. |
| 2018/0123496 A1 | 5/2018 | Llic et al. |
| 2019/0089225 A1* | 3/2019 | Da Costa et al. ...... F02B 71/04 |

* cited by examiner

DC-DC CONVERTER IN A NON-STEADY SYSTEM

The present disclosure is directed towards a DC-DC converter in a non-steady system, such as in a free-piston machine. More particularly, the present disclosure is directed towards a DC-DC converter being used to manage DC power to or from a non-steady system, such as a free-piston machine. This application is a continuation of U.S. application Ser. No. 16/137,029 filed Sep. 20, 2018, which claims the benefit of U.S. Provisional Patent Application No. 62/561,167 filed Sep. 20, 2017, the disclosure of each is hereby incorporated by reference herein in their entirety.

BACKGROUND

Systems that convert between kinetic energy and electrical energy sometimes exhibit large output voltage fluctuations, especially if no mechanical energy storage device is used. In a conventional piston-cylinder device, for example, a flywheel can maintain a nearly constant crankshaft speed, even though the extraction of energy is discontinuous by nature. For example, in the context of a conventional piston engine, energy is transferred to the crankshaft during an expansion stroke, while it is removed from the crankshaft during a compression stroke. Conventional engines can therefore be connected to a constant power load, such as an electric motor, without any additional device to manage the energy transfer. Systems that do not include a flywheel or equivalent device, such as a free-piston machine, for example, operate with discontinuous energy transfers.

Systems that are connected to an electrical grid must provide power that meets the requirements of the grid. Large fluctuations, on a DC bus coupled to a system, for example, place operational demands on a corresponding grid tie inverter (GTI). Additionally, operation of the system is constrained to limit fluctuations of voltage of the DC bus.

SUMMARY

In some embodiments, a power management system that receives a power input from a power generator includes a DC bus, at least one energy storage device, and a DC-DC converter coupled to the DC bus. The DC-DC converter is configured to output a smoothed power output relative to the power input. For example, in some embodiments, the power generator includes a free-piston engine. In a further example, in some embodiments, the DC bus includes two buses, having a relative voltage between each other. In a further example, in some embodiments, a power management system includes an inverter, wherein the grid tie inverter is coupled to the output.

In some embodiments, a power management system includes circuitry coupled to the DC bus. The circuitry is configured to control a plurality of currents in a plurality of respective phases of the power generator and output a pulsed power profile to the DC bus. For example, the free-piston engine may include one or more linear electromagnetic machines which include a respective plurality of phases.

In some embodiments, the DC-DC converter is a first DC-DC converter, the inverter is coupled to at least one of a power grid and a load, and the system includes a second DC-DC converter coupled to the energy storage device and to the inverter.

In some embodiments, the at least one energy storage device includes at least one capacitor. In some embodiments, the at least one energy storage device includes a battery system. In some embodiments, the at least one energy storage device is configured to store and release electrical energy from the DC bus.

In some embodiments, the output has a corresponding voltage, and the DC-DC converter is configured to regulate the voltage. In some embodiments, the DC-DC converter is adjustable, and the power management system includes a control system configured to adjust one or more operating characteristics of the DC-DC converter (e.g., a voltage). In some embodiments, the DC-DC converter includes a step-down converter, a step-up converter, or both.

In some embodiments, a power management system that receives power from a power input and provides a power output to a free-piston machine includes a DC bus, at least one energy storage device, and a DC-DC converter coupled to the DC bus. The DC-DC converter is configured to output a pulsed power output to the free-piston machine relative to the power input. For example, in some embodiments, the power generator includes a free-piston engine. In a further example, in some embodiments, the DC bus includes two buses, having a relative voltage between each other. In a further example, in some embodiments, a power management system includes a grid tie inverter, wherein the grid tie inverter is coupled to the input.

In some embodiments, the power management system includes circuitry coupled to the DC bus. The circuitry is configured to control a plurality of currents in a plurality of respective phases of an electric motor of the free-piston machine, and
receive a pulsed power profile from the DC bus.

In some embodiments, the DC-DC converter is a first DC-DC converter, and the system includes an inverter coupled to a power grid, and a second DC-DC converter coupled to the energy storage device and to the inverter.

In some embodiments, the at least one energy storage device includes at least one capacitor. In some embodiments, the at least one energy storage device includes a battery system. In some embodiments, the at least one energy storage device is configured to store and release electrical energy from the DC bus.

In some embodiments, the input has a corresponding voltage, and the DC-DC converter is configured to regulate the voltage. In some embodiments, the DC-DC converter is adjustable, and the power management system includes a control system configured to adjust one or more operating characteristics of the DC-DC converter (e.g., a voltage). In some embodiments, the DC-DC converter includes a step-down converter, a step-up converter, or both.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed towards a DC-DC converter being used to manage DC power to or from a non-steady system, such as a free-piston machine. The present disclosure provides architectures for providing power interactions with a free-piston machine. The architectures may include one or more DC-DC converters and energy storage devices, while avoiding negative impacts on a grid tie inverter (GTI) and motor power electronics. In some embodiments, the present disclosure describes including one or more DC/DC converters on a DC bus to absorb the voltage fluctuations from an energy storage device.

As used herein, an energy storage device (ESD) shall refer to any suitable device that is configured to store and release electrical energy in quantities and on time scales of interest to the present disclosure (e.g., to pulsed power profiles). Illustrative examples of an ESD include a battery or other electrochemical cell, a capacitor or bank of capacitors, an inductor, a magnetic field, or any combination thereof.

As used herein, a DC-DC converter shall refer to any suitable device that is configured to convert electrical power between direct current (DC) voltage levels. A DC-DC converter may include, for example, an electronic circuit, a magnetic device, an electromechanical device, any other suitable device, or any combination thereof, having any suitable topology.

Figure 1:
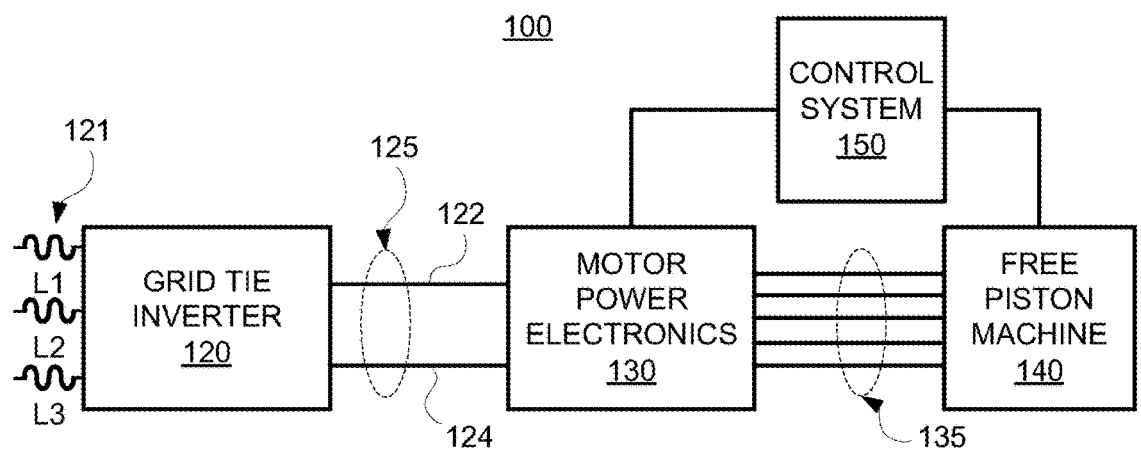
FIG. 1 shows a diagram of an illustrative system, in accordance with some embodiments of the present disclosure.

FIG. 1 shows a diagram of an illustrative system 100, in accordance with some embodiments of the present disclosure. System 100 includes free-piston machine 140, motor power electronics 130, control system 150, and GTI 120. It will be understood that the present disclosure also applies to powered systems that require a pulsed power profile, in addition to generator systems that output a pulsed power profile. For purposes of discussion, the following descriptions are framed primarily in terms of generators but will be applicable to powered systems as well.

Figure 7:
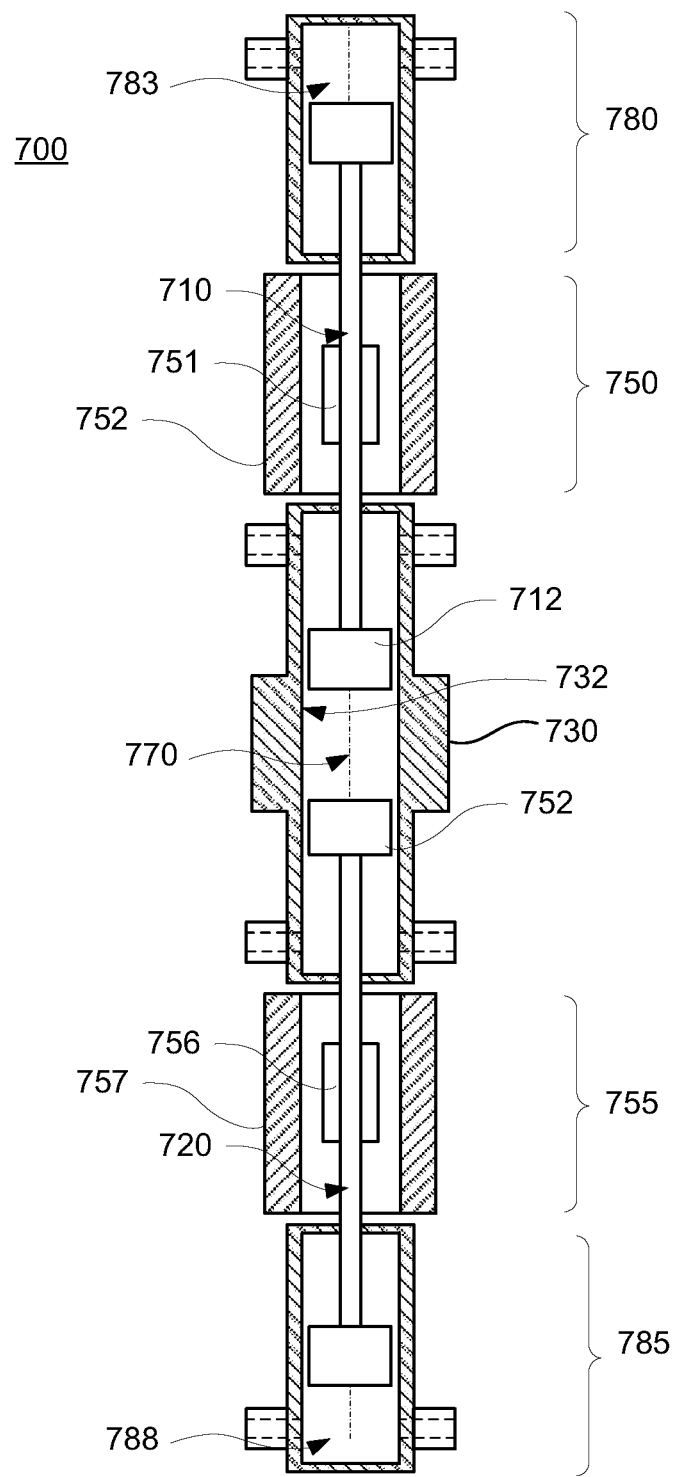
FIG. 7 shows a cross-section view of an illustrative free-piston machine, in accordance with some embodiments of the present disclosure.

Free-piston machine 140 may include a system similar to that shown in FIG. 7, for example. In general, free-piston machine 140 may include translating assemblies (i.e., "translators") that may undergo reciprocating motion relative to a stator under the combined effects of gas pressures and electromagnetic forces. The translators may, but need not, include permanent magnets that may generate a back electromotive force (emf) in phases of the respective stator. Note that, as used herein, and as widely understood, back emf refers to a voltage induced across the stator windings from the moving translator. Motor power electronics 130 is configured to provide current to the phases of the stators. For example, motor power electronics 130 may expose phase leads of phases of the stator to one or more buses of a DC bus, a neutral, a ground, or a combination thereof.

Motor power electronics 130 may include, for example, insulated gate bipolar transistors (IGBTs), diodes, current sensors, voltage sensors, circuitry for managing Pulse Width Modulation (PWM) signals, any other suitable components, or any suitable combination thereof. In some embodiments, motor power electronics 130 may interface with free-piston machine 140 via phase leads 135 which couple to phase windings of the stators, and motor power electronics 130 may interface with GTI 120 via DC bus 125 (e.g., a pair of buses, one bus at a higher voltage relative to the other bus). Bus 122 and bus 124 together form DC bus 125 in system 100. For example, bus 122 may be at nominally 800 V relative to 0 V of bus 124 (e.g., bus 122 is the "high" and bus 124 is the "low"). Bus 122 and bus 124 may be at any suitable, nominal voltage, which may fluctuate in time about a mean value, in accordance with the present disclosure. Accordingly, the term "DC bus" as used herein shall refer to a pair of buses having an established mean voltage difference, although the instantaneous voltage may fluctuate, vary, exhibit noise, or otherwise be non-constant.

GTI 120 may be configured to manage electrical interactions between AC grid 121 (e.g., three-phase 480VAC) and DC bus 125. In some embodiments, GTI 120 is configured to provide electrical power to AC grid 121 from free-piston machine 140 (e.g., a free-piston engine) via motor power electronics 130. In some embodiments, GTI 120 may be configured to source electrical power from AC grid 121 to input to free-piston machine 140 (e.g., a free-piston air compressor) via motor power electronics 130. In some embodiments, GTI 120 manages electrical power in both directions (i.e., bi-directionally to and from AC grid 121). In some embodiments, GTI 120 rectifies AC power from AC grid 121 to supply electrical power over DC bus 125. In some embodiments, GTI 120 converts DC power from DC bus 125 to AC power for injecting into AC grid 121. In some embodiments, GTI 120 generates AC waveforms of current and voltage that are suitable for AC grid 121. For example, GTI 120 may manage a power factor, voltage, and frequency of AC power injected into AC grid 121.

Although shown as being coupled to AC grid 121 in FIG. 1, GTI 120 may be coupled directly to a load, a power source, another generator system, another GTI, any other suitable electric power system, or any combination thereof. For example, generator system 100 may be in "islanding" mode or "stand-alone" mode, wherein AC grid 121 may be a local AC grid, having an AC load.

While the present disclosure is described herein in terms of a GTI, it will be understood that any suitable type of power inverter (also referred to as an inverter) may be used. Moreover, in some embodiments, neither a GTI nor any other type of inverter need be used. For example, the power output of the DC bus may be coupled to a DC grid, a DC load, any other suitable DC structure or architecture, or any combination thereof. Power fluctuations can affect many such systems. The use of a GTI is provided merely for purposes of illustration and not by way of limitation.

Figure 2:
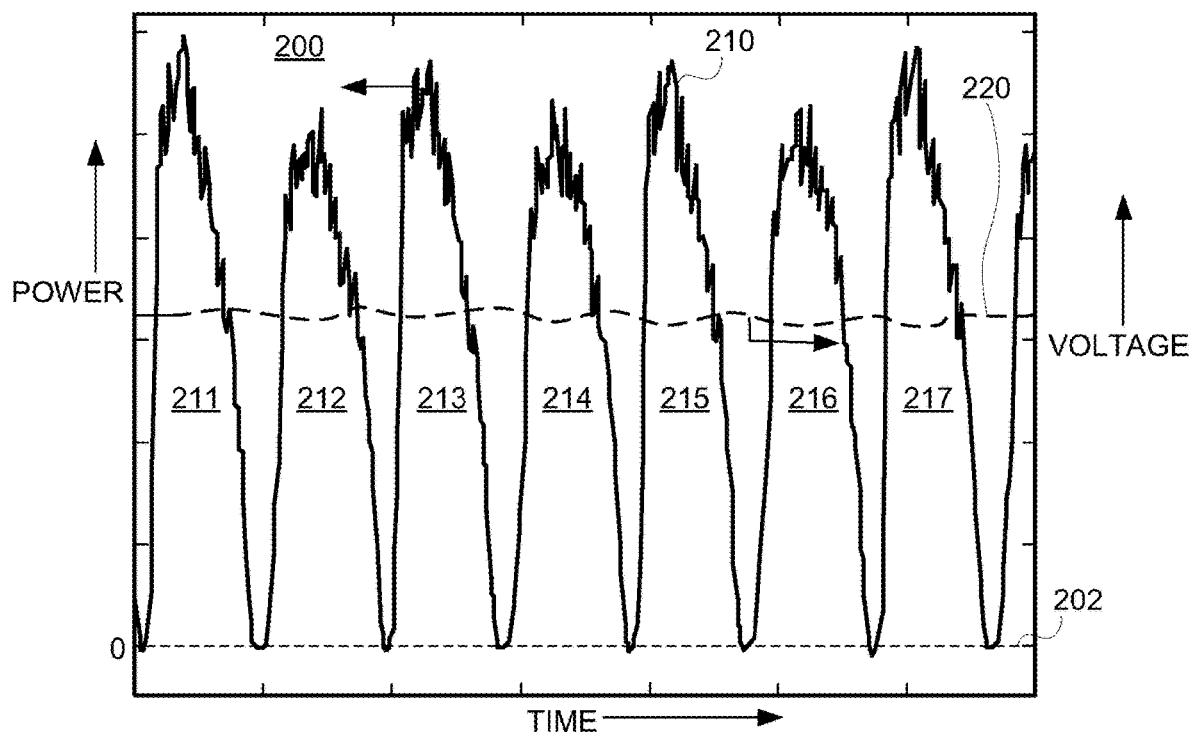
FIG. 2 shows a plot of illustrative power and voltage time traces, in accordance with some embodiments of the present disclosure.

FIG. 2 shows plot 200 of illustrative power and voltage time traces, in accordance with some embodiments of the present disclosure. Power time trace 210 and voltage time trace 220 may be representative of electrical conditions on DC bus 125 of FIG. 1. The horizontal axis of plot 200 is presented in units representative of time (e.g., seconds, milliseconds, or number of sample time steps), while the left vertical axis is presented in units representative of power (e.g., kW, horsepower) and the right vertical axis is presented in units representative of voltage (e.g., volts). As illustrated in FIG. 1, illustrative power time trace 210 is representative of power generation (e.g., from a free-piston linear generator), and accordingly includes primarily positive values. It will be understood that for motored conditions, which include power being input rather than generated, the value of power time trace 210 is primarily negative.

Power time trace 210 exhibits pulsed, or highly fluctuating, behavior, which is termed herein as a "pulsed power profile." In some embodiments, power is extracted from, or supplied to, a free-piston machine during both expansion and compression strokes (e.g., strokes of an engine cycle, or an air compression cycle). For example, the power is proportional to velocity (e.g., power may be equal to the dot product of force and velocity). Near the apices, under some circumstances, the electric motors' ability to extract energy is reduced (e.g., due to force limitations) as the translator speed reduces to 0 (e.g., near a turnaround position). For example, when the translator velocity is at or near zero, it may be impractical to extract or supply power. The reciprocating character of the free-piston machine (e.g., a linear free-piston machine) thus may cause a pulsed power profile to be outputted (e.g., when the free-piston machine is generating power output), or a pulsed power profile to be required (e.g., when motoring the free-piston machine with a power input).

For example, peaks 211, 213, 215, and 217 of power time trace 210 are caused by the translator moving a first direction (e.g., either expansion or compression), while peaks 212, 214, and 216 are caused by the translator moving in a direction opposite to the first (e.g., either compression or expansion). When the translator changes its direction of motion (e.g., in between peaks, when translator velocities are at or near zero), the power output is near zero. Voltage time trace 212 exhibits relatively lower fluctuations, characteristic of, for example, the ability of a GTI to regulate a DC bus. Under some circumstances, a power utility grid may be unlikely to directly accept a pulsed power profile (e.g., having a large coefficient of variance) like power time trace 210. Further, sizing a GTI to manage a pulsed power profile may present challenges. For example, at or near the peaks in power, the instantaneous power may be much greater than the average power. Accordingly, an inverter may need to be sized to manage the peak power even if the average power is significantly less.

In some embodiments, multiphase electromagnetic machines rely on a DC bus to provide, or remove, electrical energy. In some embodiments, multiphase electromagnetic machines include windings (e.g., windings of copper wire around ferrous cores), through which a controller current flows, producing an electromagnetic force on a translating assembly (e.g., a piston assembly having permanent magnets). The windings may be grouped into phases (e.g., coupled in series), for which the current is independently controllable. For example, the control of current in windings of one or more phases of a linear, free-piston machine may rely on a DC bus to provide current to the windings via motor power electronics 130. In some circumstances, a DC bus is generated and maintained by rectifying and regulating electrical power from an AC source such as an AC grid. Due to the pulsed, non-steady character of power to or from free-piston machines, maintaining the DC bus likely benefits from the use of GTIs, DC-DC converters, energy storage devices, and other components. The use of an energy storage device allows for fluctuations in electrical power to be smoothed, by the storage of electrical energy. The use of a DC-DC converter allows for fluctuations in voltage (e.g., caused by the energy storage device sourcing or sinking electrical energy) to be smoothed.

In some embodiments, one or more GTIs are used. For example, if more than one GTI is used, a DC bus may be divided into several DC buses (e.g., for redundancy). Motor power electronics (MPE) may be implemented in various ways. In some embodiments, an energy storage device (e.g., a capacitor bank, a battery bank) is divided, distributed, and integrated directly in one or more MPE modules.

In some embodiments, the voltage at an energy storage device undergoes fluctuations over time, because of energy storage and release processes. For example, in order to reduce cost and/or size and/or weight, it is of interest to limit the total capacitance of a capacitor bank on a DC bus, which has a direct consequence of increasing a voltage swing on the DC bus. In an illustrative embodiment, one or more capacitor banks may be connected directly to one or more DC buses. Accordingly, the DC bus voltage varies over time. If the capacitor bank were sized with a minimum capacitance, then the voltage fluctuation would be significant. The voltage fluctuation causes, for example, overstress of the GTI and MPE, reduced efficiency of the GTI and MPE, or other ill effects. In some circumstances, these detrimental effects may become significant, which requires an oversizing of the capacitor bank.

For example, if an MPE circuit topology such as either 1) a half-bridge per phase in a wye (or star) configuration, or 2) a half-bridge or full-bridge per phase in an independent phase current (IPC) configuration, then the maximum phase voltage may be limited. Accordingly, the motor force may be limited. Phase windings may be adapted to reduce back emf, which may increase current, and associated losses in both a motor and corresponding MPE.

In some embodiments, an energy storage device is coupled to a DC bus, and a corresponding MPE, GTI, or both, include voltage step-up capability.

FIGS. 3-6 show illustrative systems including a DC bus in accordance with the present disclosure. The number of linear electromagnetic machines (LEMs) included in any of the systems is illustrative and may range from a single LEM to many LEMs. Any suitable LEM, or combination thereof, may receive or provide a pulsed power profile, for which a smoothed power profile may be desired for coupling to an AC grid via a GTI. It will also be understood that although a GTI is shown in each of the systems of FIGS. 3-6, a GTI may be omitted, more than one GTI may be included, or a combination of a GTI and other suitable equipment may be used. It will also be understood that illustrative LEMs shown in FIGS. 3-6 may correspond to systems (e.g., free-piston machines) that output power (e.g., engines), or require power (e.g., compressors). It will also be understood that two or more components may be coupled together, yet still have one more components coupled in between. Accordingly, the term "coupled" as used herein allows for a direct connection or an interaction via an intervening component.

Figure 3:
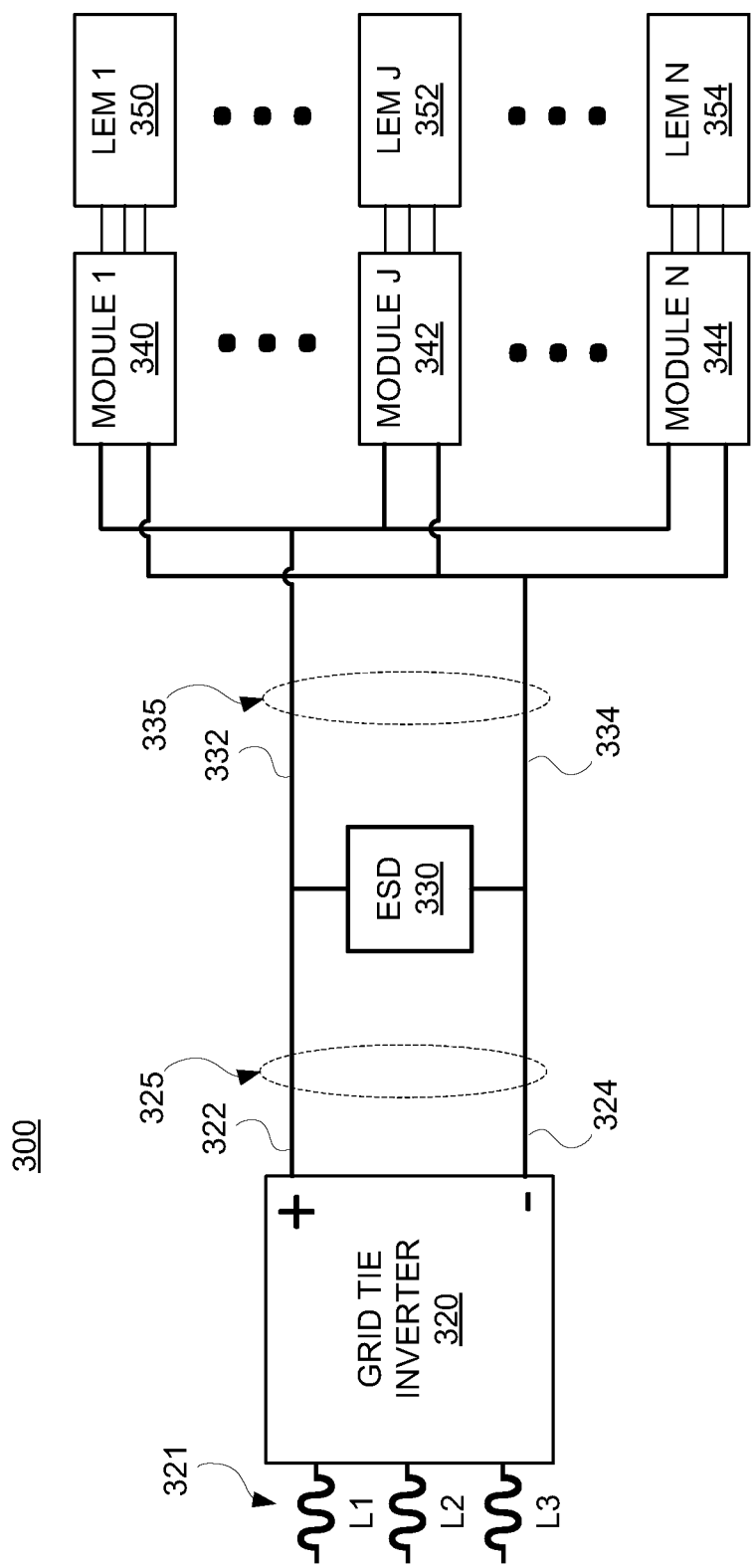
FIG. 3 shows a diagram of an illustrative system, including an energy storage device, in accordance with some embodiments of the present disclosure.

FIG. 3 shows a diagram of illustrative system 300, including energy storage device 330, in accordance with some embodiments of the present disclosure. In some embodiments, an energy storage device, or energy storage system, is used to compensate for the coefficient of variance in the power output of a free-piston machine.

System 300 includes LEMs 350, 352, and 354, representing the motor-generators of one or more free-piston machines. Modules 340, 342, and 344 are configured to control phase currents in phases of respective LEMs 350, 352, and 354. As shown in FIG. 3, modules 340, 342, and 344 are coupled to DC bus 335, which includes buses 322 (e.g., a "high" bus) and 324 (e.g., a "low" bus). Although shown as having "N" modules, coupled to respective LEMs, coupled to DC bus 335, in some embodiments, a single module may be coupled to DC bus 335. DC bus 325 is coupled to GTI 320 (e.g., via suitable terminals), and also to DC bus 335 (e.g., via energy storage device 330). In some embodiments, the voltages of bus 322 and bus 332 are substantially similar to each other, and the voltages of bus 324 and bus 334 are substantially similar to each other.

In some embodiments, the power transmitted at any instant via DC bus 325 and DC bus 335 differ, due to energy storage, and changes of energy stored therein, in energy storage device 330. For example, a pulsed power output from modules 340, 342, and 344 onto DC bus 335 may exhibit relatively less fluctuation on DC bus 325 due to energy storage of energy storage device 330. In a further example, a pulsed power requirement for modules 340, 342, and 344 from DC bus 335 may source power exhibiting less fluctuation from DC bus 325 due to energy storage of energy storage device 330. Accordingly, the presence of energy storage device 330 may reduce fluctuations of power, over time, on at least one DC bus.

In some circumstances, the presence of energy storage device 330 in generator system 300 may cause voltage fluctuations, as energy is stored and released. In some embodiments, GTI 320 and modules 340, 342, and 344 may accommodate the voltage fluctuations. For example, in the presence of voltage fluctuations, modules 340, 342, and 344 may still be able to control respective LEMs 350, 352, and 354. In a further example, in the presence of voltage fluctuations, GTI 320 may still be able to control respective LEMs 350, 352, and 354.

In some circumstances, for example, GTI 320 and modules 340, 342, and 344 may have difficulty accommodating the voltage fluctuations which may be caused by energy storage device 330. Accordingly, a DC-DC converter may be used to aid in maintaining lower voltage fluctuations on a DC bus.

A module (e.g., any or all of modules 340, 342, and 344), as referred to herein in the context of FIGS. 3-6, may include motor power electronics, control circuitry, sensors, phase leads and corresponding hardware, any other suitable components or systems for managing current in phases of an LEM, or any suitable combination thereof.

Figure 4:
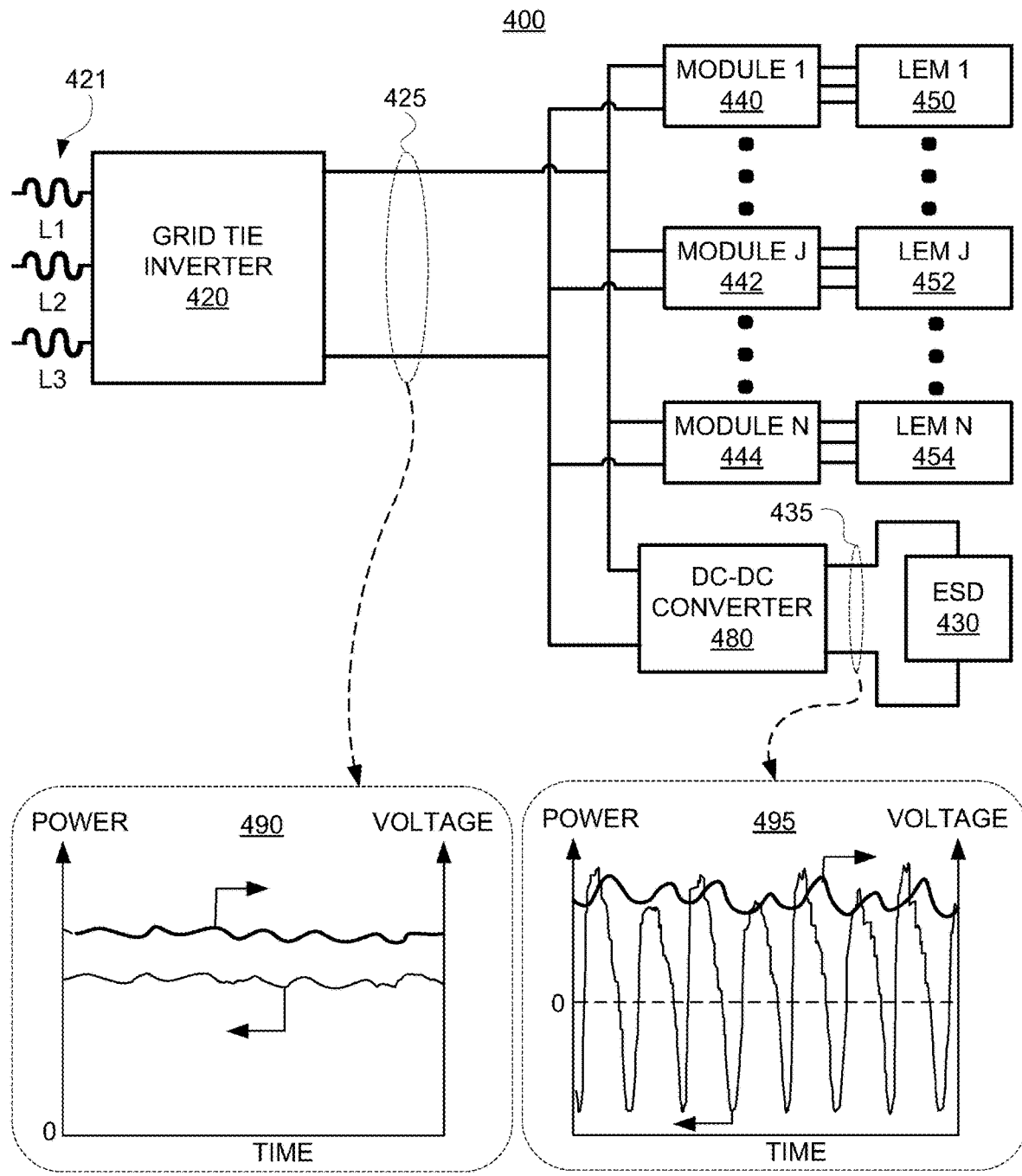
FIG. 4 shows a diagram of an illustrative system, including an energy storage device and a DC-DC converter, in accordance with some embodiments of the present disclosure.

FIG. 4 shows a diagram of illustrative system 400, including energy storage device 430 and DC-DC converter 480, in accordance with some embodiments of the present disclosure. System 400 includes LEMs 450, 452, and 454 (e.g., which may be included in one or more multiphase electromagnetic machines). Modules 440, 442, and 444 are configured to control phase currents in phases of respective LEMs 450, 452, and 454. In some embodiments, modules 440, 442, and 444 may include power electronics, control circuitry, sensors, any other suitable components, or any suitable combination thereof. As shown in FIG. 4, modules 440, 442, and 444 may be coupled to DC bus 425. GTI 420 couples DC bus 425 to AC grid 421. LEMs 450, 452, and 454 may each provide, or require, a pulsed power profile on DC bus 425.

As shown in FIG. 4, DC-DC converter 480 couples energy storage device 430 to DC bus 425. Accordingly, power transfer though DC-DC converter 480 allows the power profile at DC bus 425 to be relatively smoother. For example, the energy stored in energy storage device 430 may exhibit large variations in time, effectively sourcing and sinking power to DC bus 425 from DC bus 435. DC-DC converter 480 may regulate the bus voltage of DC bus 425 to a constant setpoint (e.g., although it may exhibit some fluctuation, perturbation, noise, or a combination thereof). Plots 490 and 495 exhibit illustrative time traces, as discussed below.

Plot 490 shows illustrative voltage and power time traces representative of DC bus 425. Both voltage and power exhibit relatively small fluctuations, and accordingly, may be suitable for interacting with AC grid 421 via GTI 420. Plot 495 shows illustrative voltage and power time traces representative of DC bus 435. Both voltage and power exhibit fluctuations, with power swinging from positive to negative values. Accordingly, the use of DC-DC converter 480 and energy storage device 430 may effectively isolate large fluctuations on DC bus 435 rather than DC bus 425 to aid in GTI 420 interacting with AC grid 421.

In some embodiments, energy storage device 430 may include a capacitor, a capacitor bank, a battery, any other suitable device that stores energy, or any combination thereof. In some embodiments, a suitable energy storage device is capable of storing and releasing energy in quantities, and on time scales and at voltages, relevant to system 400. For example, energy storage device 430 may include a capacitor bank, coupled to DC bus 435 which may operate at a voltage approximately equal to, less than, or greater than, that of DC bus 425. In some embodiments, DC-DC converter 480 is bi-directional, and accordingly may output energy to DC bus 435, DC bus 425, or both (e.g., alternately in time) depending on the temporal energy flows and storage of system 400.

In some embodiments, DC-DC converter 480 is configured to communicate with a control system (e.g., similar to control system 150 of FIG. 1). For example, a control system may specify a DC voltage level of a DC-DC converter. In a further example, a control system may receive status information from a DC-DC converter (e.g., "running," "faulted," or "error"). In a further example, a control system may determine a measurement of an output, an input, or a state of a DC-DC converter (e.g., a DC bus voltage, an amount of power transmitted, a current, a variance in a measurement, a temperature of the DC-DC converter, or an energy loss).

For purposes of clarity, the following relationships will be defined herein.

Instantaneous power:

$$\text{Power} = \frac{dE}{dt} = V(t)*I(t)$$

in which V(t) is the voltage across suitable terminals, I(t) is the current in the suitable terminals, and Power is the instantaneous change in energy with time at the suitable terminals.

Energy:

$$\text{Energy} = E(t) = E0 + \int_0^t \text{Power}*dt$$

in which E(t) is the instantaneous energy at time t, E0 is a reference energy value (e.g., at time=0), Power is the instantaneous power, and dt is the differential time.

Energy in ESD:

$$\text{Stored Energy} = E(t) = \frac{1}{2}CV(t)^2$$

in which E(t) is the instantaneous energy at time t, C is an effective capacitance (i.e., constant as shown, although the capacitance need not be constant in time), and V(t) is the voltage across suitable terminals of the ESD.

Figure 5:
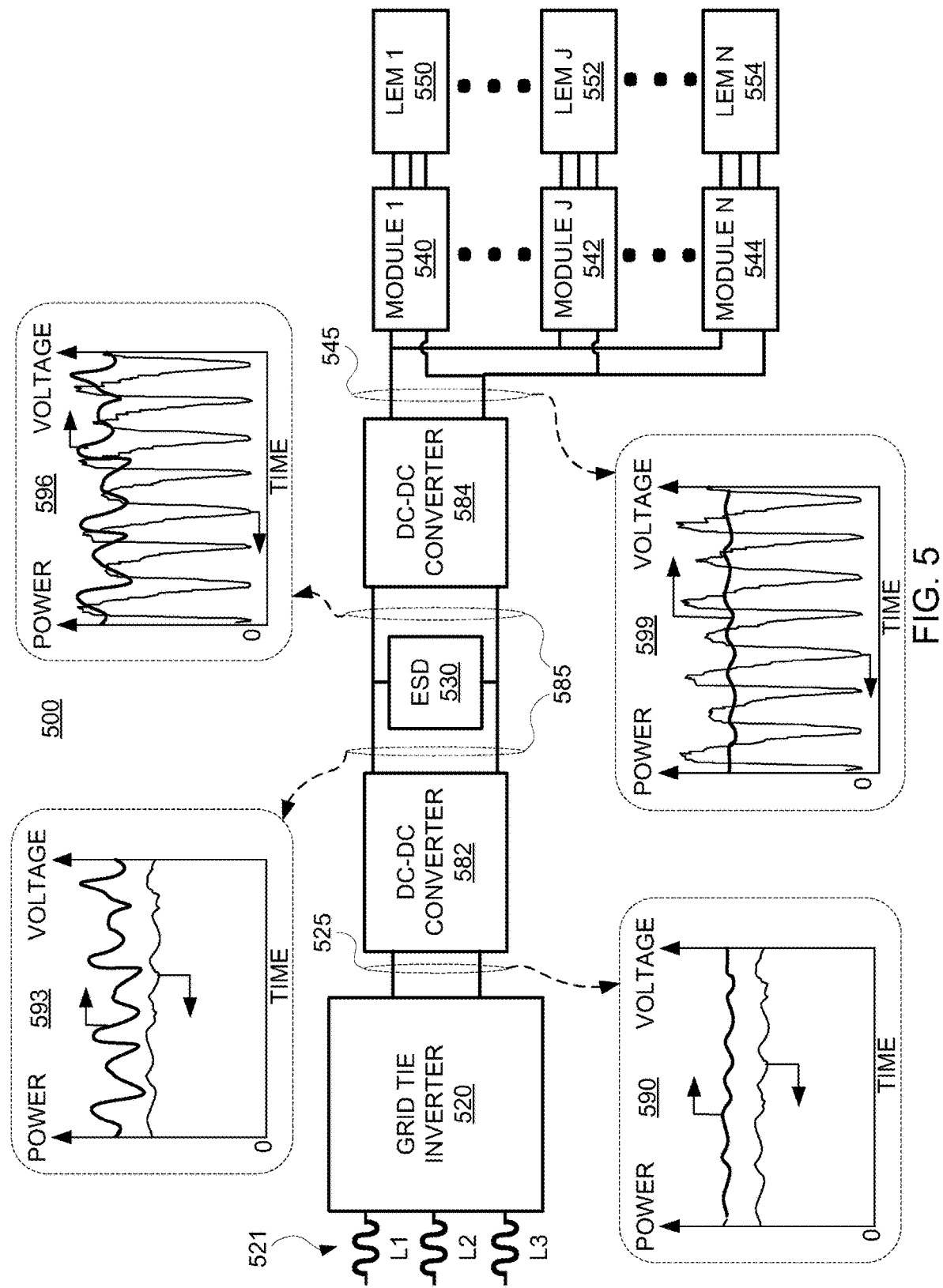
FIG. 5 shows a diagram of an illustrative system, including an energy storage device and two DC-DC converters, in accordance with some embodiments of the present disclosure.

FIG. 5 shows a diagram of illustrative system 500, including energy storage device 530 and DC-DC converters 582 and 584, in accordance with some embodiments of the present disclosure. System 500 includes LEMs 550, 552, and 554 (e.g., which may be included in one or more multiphase electromagnetic machines). Modules 540, 542, and 544 are configured to control phase currents in phases of respective LEMs 550, 552, and 554. In some embodiments, modules 540, 542, and 544 include power electronics, control circuitry, sensors, any other suitable components, or any suitable combination thereof. As shown in FIG. 5, modules 540, 542, and 544 are coupled to DC bus 545. GTI 520 couples DC bus 525 to AC grid 521. LEMs 550, 552, and 554 each provide, or require, a pulsed power profile on DC bus 545.

System 500 includes three DC buses: DC bus 525, DC bus 585, and DC bus 545. DC bus 525 is coupled to GTI 520 and to DC-DC converter 582. DC bus 585 is coupled to DC-DC converter 582, DC-DC converter 584, and to energy storage device 530. DC bus 545 is coupled to DC-DC converter 584 and to modules 540, 542, and 544. In some embodiments, DC-DC converters 582 and 584 are configured to communicate with a control system (e.g., similar to control system 150 of FIG. 1).

Plots 590, 593, 596, and 599 show illustrative voltage and power profiles along the DC buses. Plot 599 shows representative voltage and power profiles provided by, or required to, modules 540, 542, and 544. The pulsed power profiles characteristic of LEMs 550, 552, and 554 cause the power to fluctuate on DC bus 545. DC-DC converter 584 is configured to transmit power between DC bus 545 and DC bus 585. As shown in plots 599 and 596, the pulsed power profile from LEMs 550, 552, and 554 is also present on DC bus 585. Energy storage device 530 is configured to store and release electrical energy on DC bus 585 such that the power profile on DC bus 585 at DC-DC converter 582 exhibits relatively less fluctuation than the power profile on DC bus 585 at DC-DC converter 584, as shown by plots 593 and 596. While the voltage across DC bus 585 may be approximately the same everywhere between DC-DC converters 582 and 584, the power profiles on DC bus 585 at DC-DC converters 582 and 584 may differ from each other due to energy accumulation in energy storage device 530. The relatively smoothed power profile on DC bus 585 at DC-DC converter 582, shown in plot 593, is transmitted by DC-DC converter 582 to DC bus 525. Accordingly, the fluctuation in power on DC bus 525 is reduced compared to the fluctuation in power on DC bus 545, and accordingly may be appropriate for GTI 520.

Figure 6:
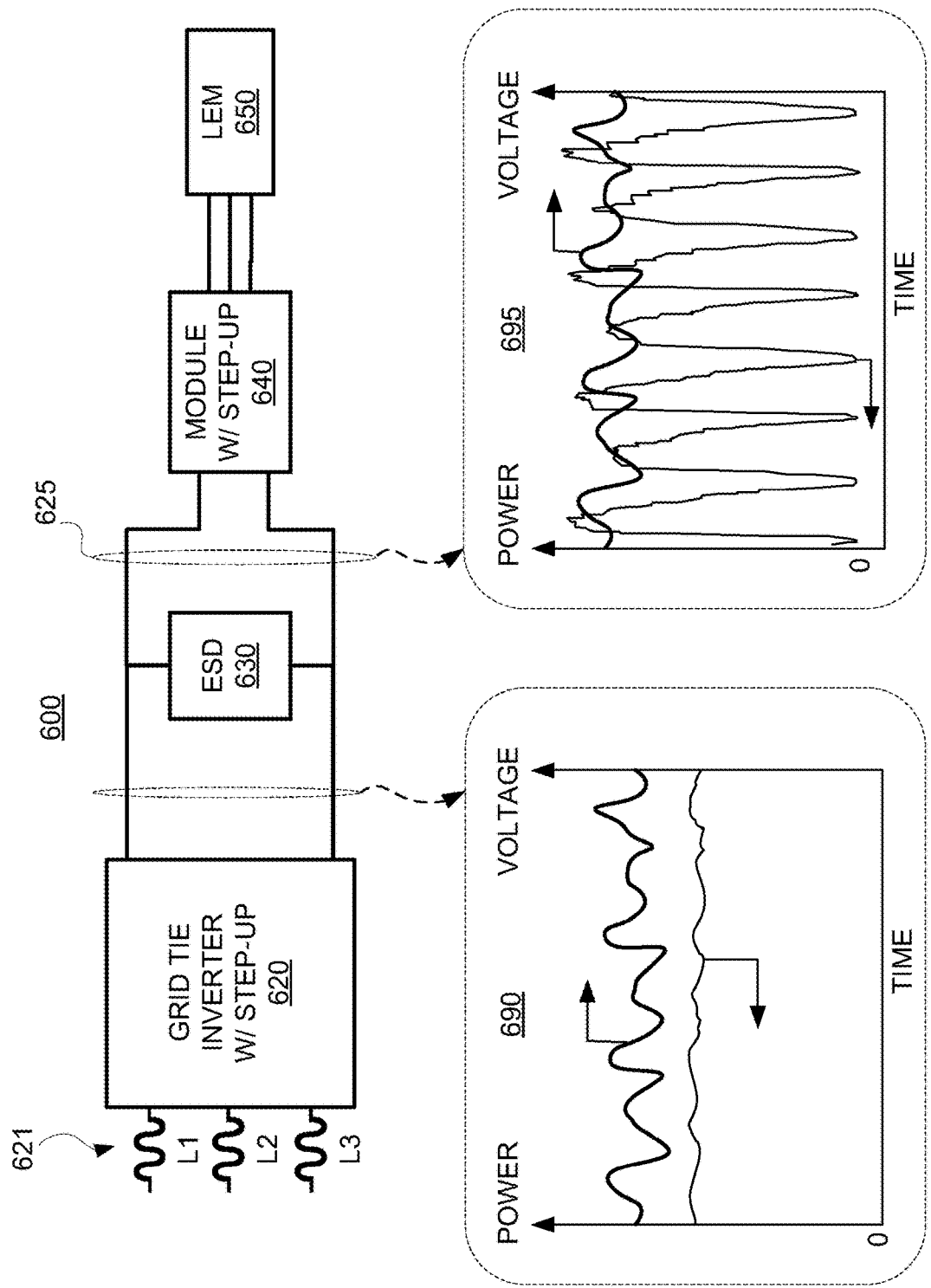
FIG. 6 shows a diagram of an illustrative system, including an energy storage device and integrated DC-DC converters, in accordance with some embodiments of the present disclosure.

FIG. 6 shows a diagram of illustrative system 600, including energy storage device 630 and integrated DC-DC converters as part of GTI 620 and module 642, in accordance with some embodiments of the present disclosure. System 600 includes LEM 650 which may be included in one or more multiphase electromagnetic machines. Any suitable number of LEMs may be included in system 600 coupled to DC bus 625, although only a single LEM is illustrated in FIG. 6. Module 640 is configured to control phase currents in phases of LEM 650. In some embodiments, modules 640 includes power electronics, control circuitry, sensors, any other suitable components, or any suitable combination thereof. As shown in FIG. 6, module 640 is coupled to DC bus 625. GTI 620 couples DC bus 625 to AC grid 621. LEM 650 may provide, or require, a pulsed power profile on DC bus 625.

System 600 includes DC bus 625 coupled to GTI 620 and to energy storage device 630. GTI 620 may include a DC-DC converter having any suitable topology, and module 640 may include a DC-DC converter having any suitable topology. Accordingly, in some embodiments, DC bus 625 has a corresponding voltage that is designed for, optimized for, or otherwise appropriate for, energy storage device 630. In some embodiments, GTI 620 and module 640 include step-up converters, so that DC bus 625 operates at a voltage larger than that used to cause current flow in windings of LEM 650.

While some inverters are Buck-derived and thus cannot step up voltage, GTI 620, module 640, or both, may include suitable topologies that may step up voltage (e.g. buck-boost converter, or Ćuk converters). In some embodiments, the use of a GTI, module, or both having DC-DC conversion functionality reduces cost, improves efficiency, simplifies the system, or results in a combination thereof.

Plots 690 and 695 show representative voltage and power profiles along DC bus 625. Plot 599 shows representative voltage and power profiles provided by, or required as an input to, module 640. The pulsed power profile characteristic of LEM 650 causes the power to fluctuate on DC bus 625 at module 640. Energy storage device 630 is configured to store and release electrical energy on DC bus 625 such that the power profile on DC bus 625 at GTI 620 exhibits relatively less fluctuation than the power profile on DC bus 625 at module 640, as shown by plots 690 and 695. While the voltage on DC bus 625 may be approximately the same along the bus lines, the power profiles on DC bus 625 at GTI 620 and module 640 may differ from each other due to energy accumulation in energy storage device 630. The relatively smoothed power profile on DC bus 625 at GTI 620, shown in plot 690, may be transmitted to AC grid 621. Accordingly, the fluctuation in power on DC bus 625 is reduced at GTI 620 compared to the fluctuation in power on DC bus 625 at module 640, and accordingly may be appropriate for GTI 620.

In some embodiments, GTI 620, module 640, or both, communicate with a control system (e.g., similar to control system 150 of FIG. 1). For example, a control system may specify a DC voltage level of a DC-DC converter. In a further example, a control system may receive status information from an integrated DC-DC converter (e.g., "running," "faulted," or "error"). In a further example, a control system may determine a measurement of an output, an input, or a state of an integrated DC-DC converter (e.g., a DC bus voltage, an amount of power transmitted, a current, a variance in a measurement, a temperature of a component, or an energy loss in a component).

FIG. 7 shows a cross-section view of an illustrative free-piston machine 700, in accordance with some embodiments of the present disclosure. Free-piston assemblies 710 and 720 include respective pistons 712 and 752, respective pistons 782 and 787, and respective translator sections 751 and 756. Free-piston machine 700 includes cylinder 730, having bore 732, which may house a high-pressure section (e.g., a combustion section) between pistons 712 and 752.

In some embodiments, free-piston machine 700 includes gas springs 780 and 785, which may be used to store and release energy during a cycle in the form of compressed gas (e.g., a driver section). For example, free-piston assemblies 710 and 720 may each include respective pistons 782 and 787 in contact with respective gas regions 783 and 788 (e.g., high-pressure regions).

Cylinder 730 may include bore 732, centered about axis 770. In some embodiments, free-piston assemblies 710 and 720 may translate along axis 770, within bore 732, allowing the gas region in contact with pistons 712 and 752 to compress and expand.

In some embodiments, free-piston assemblies 710 and 720 include respective magnet sections 751 and 756, which interact with respective stators 752 and 757 to form respective linear electromagnetic machines 750 and 755. For example, as free-piston assembly 710 translates along axis 770 (e.g., during a stroke of an engine cycle), magnet section 751 may induce current in windings of stator 752. Further, current may be supplied to respective phase windings of stator 752 to generate an electromagnetic force on free-piston assembly 710 (e.g., to affect motion of free-piston assembly 710).

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston engines and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors and free-piston compressors. In some embodiments, the present disclosure is applicable to gas springs. In some embodiments, the present disclosure is applicable to oil-free reciprocating and free-piston engines and compressors. In some embodiments, the present disclosure is applicable to oil-free free-piston engines with internal or external combustion or reactions. In some embodiments, the present disclosure is applicable to oil-free free-piston engines that operate with compression ignition, spark ignition, or both. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source or external reaction such as combustion).

It will be further understood that, while the present disclosure is described in the context of free-piston machines, the concepts disclosed herein are applicable to any other suitable non-steady systems. The use of free-piston machines herein is merely for purposes of brevity and clarity.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A power management system comprising:
    a DC bus comprising a first bus at a first voltage and a second bus at a second voltage lower than the first voltage;
    an inverter comprising a first DC-DC converter coupled to the DC bus, wherein the inverter is configured to output a smoothed power output relative to a power output from a free-piston power generator;
    at least one energy storage device coupled to the DC bus, wherein the at least one energy storage device is configured to store and release electrical energy from the DC bus; and
    a power electronics module comprising a second DC-DC converter coupled to DC bus and to the free-piston power generator, wherein the power electronics module is configured to receive the power output from the free-piston power generator.

2. The power management system of claim 1, further comprising circuitry coupled to the power electronics module and configured to control a plurality of currents in a plurality of respective phases of the free-piston power generator to generate the power output.

3. The power management system of claim 2, wherein the free-piston power generator comprises at least one linear electromagnetic machine (LEM), and wherein the power electronics module is coupled to the at least one LEM.

4. The power management system of claim 1, wherein the inverter is configured to output a smoothed power output to at least one of a power grid or a load.

5. The power management system of claim 1, wherein the at least one energy storage device comprises at least one capacitor.

6. The power management system of claim 1, wherein the DC bus has a voltage, and wherein the inverter is configured to regulate the voltage.

7. The power management system of claim 1, wherein the power management system further comprising a control system coupled to the inverter and configured to adjust one or more operating characteristics of the inverter.

8. The power management system of claim 7, wherein the DC bus has a voltage, wherein the inverter is configured to regulate the voltage, and wherein the one or more operating characteristics of the inverter comprise the voltage.

9. The power management system of claim 1, wherein the power management system further comprises a control system coupled to the inverter, the control system configured to:
    receive status information from the DC-DC converter; and
    determine at least one state of the DC-DC converter.

10. The power management system of claim 1, wherein the power management system further comprises a control system coupled to the inverter and configured to:
    receive status information from the DC-DC converter; and
    determine a measurement of at least one of a voltage associated with the DC bus, a current associated with the DC bus, or a temperature associated with the DC-DC converter.

11. A power management system comprising:
    a DC bus comprising a first bus at a first voltage and a second bus at a second voltage lower than the first voltage;

an inverter comprising a first DC-DC converter coupled to the DC bus, wherein the inverter is configured to receive a power input;

at least one energy storage device coupled to the DC bus, wherein the at least one energy storage device is configured to store and release electrical energy from the DC bus; and a power electronics module comprising a second DC-DC converter coupled to DC bus and to a free-piston machine, wherein the power electronics module is configured to provide a pulsed power input to the free-piston machine.

12. The power management system of claim 11, further comprising circuitry coupled to the power electronics module and configured to control a plurality of currents in a plurality of respective phases of the free-piston power generator to generate the pulsed power input.

13. The power management system of claim 12, wherein the free-piston machine comprises at least one linear electromagnetic machine (LEM), and wherein the power electronics module is coupled to the at least one LEM.

14. The power management system of claim 11, wherein the inverter is configured to receive the power input from at least one of a power grid or a source.

15. The power management system of claim 11, wherein the at least one energy storage device comprises at least one capacitor.

16. The power management system of claim 11, wherein the DC bus has a voltage, and wherein the inverter is configured to regulate the voltage.

17. The power management system of claim 11, wherein the power management system further comprising a control system coupled to the inverter and configured to adjust one or more operating characteristics of the inverter.

18. The power management system of claim 17, wherein the DC bus has a voltage, wherein the inverter is configured to regulate the voltage, and wherein the one or more operating characteristics of the inverter comprise the voltage.

19. The power management system of claim 11, wherein the power management system further comprises a control system coupled to the inverter, the control system configured to:

receive status information from the DC-DC converter; and determine at least one state of the DC-DC converter.

20. The power management system of claim 11, wherein the power management system further comprises a control system coupled to the inverter and configured to:

receive status information from the DC-DC converter; and determine a measurement of at least one of a voltage associated with the DC bus, a current associated with the DC bus, or a temperature associated with the DC-DC converter.

* * * * *